E. THOMAS.
DOWEL BOLT.
APPLICATION FILED JULY 24, 1909.

1,059,578.

Patented Apr. 22, 1913.

Witnesses:
Berthold R. Van Dyke
Gerhard Pagel

Inventor:
Ernst Thomas

UNITED STATES PATENT OFFICE.

ERNST THOMAS, OF WESTIG, GERMANY.

DOWEL-BOLT.

1,059,578. Specification of Letters Patent. Patented Apr. 22, 1913.

Application filed July 24, 1909. Serial No. 509,435.

*To all whom it may concern:*

Be it known that I, ERNST THOMAS, a subject of the German Emperor, and resident of Westig i. W., Germany, have invented certain new and useful Improvements in Dowel-Bolts, of which the following is a specification.

My invention relates to dowel bolts the downwardly broadening stem of which is cemented or otherwise fixed in brickwork concrete or rocks.

According to my invention the tapering end is produced with tapering recesses in two opposite sides of the bar for increasing the width thereof beyond its original cross section. The stem thus wrought to a taper has therefore at two opposite sides a specially shaped recess extending in the longitudinal direction, each recess being closed at the lower end by a cross-web.

The object of the invention is to provide an easily and cheaply manufactured dowel-bolt which is not liable to loosen through the endwise pull of the screw-nut nor turn around. Independently of the tapering form of the stem the security of bolt is particularly due to the recesses and it is therefore important to extend such recesses uninterruptedly over the whole length of the stem as far as is possible and closing the same only at the lower end of such stem.

The material (for example cement, plaster of Paris, lead) for fixing the dowel-bolts fills the recesses of the stem and forms solid keys owing to the absence of interruptions in such recesses and thus form a permanent resistance to any likely stresses on the bolt. Bolts having a round stem provided with the aforesaid recesses are just as securely prevented from turning.

An essential advantage of the improved dowel-bolt is due to the considerable saving in weight and material without thereby reducing its tensile strength. Compared with dowel-bolts having a solid stem, my improved dowel-bolt for the same purpose may be made of lighter or smaller form by reason of its safe embedding.

The tapering recesses in the stem of the dowel bolt can be readily produced by means of forging dies, or in a press or a rolling mill.

Figure 1:
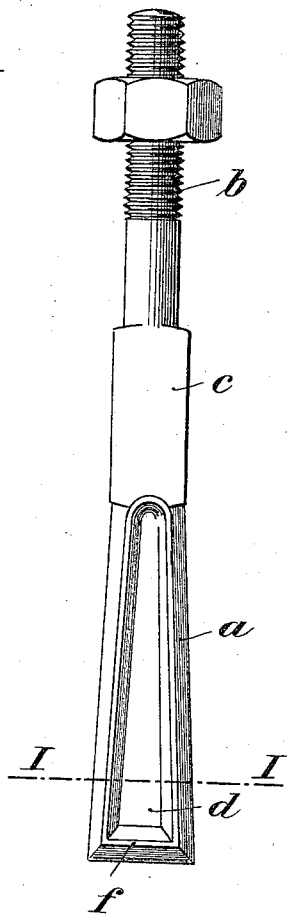
Figure 2:
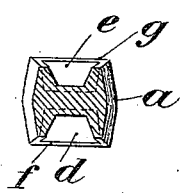

The drawing shows a constructional form of a bolt embodying my invention and Fig. 1 is a side elevation of same, while Fig. 2 shows a cross-section on line I—I of Fig. 1.

The tapering stem $a$ of the screw-bolt is provided with the usual screw threaded portion $b$ and advantageously with a square neck $c$ which will help in securing the bolt against turning around. At two opposite sides of the stem $a$ are formed uninterrupted recesses $d$ and $e$, which like the outer form of the stem become larger in the rearward direction so as to have a strong retaining cement filling. The end of the stem is formed with cross-webs $f$ and $g$ for closing the recesses $d$ and $e$. A pull on the screw causes the cross-webs to press against the filling and so co-act with the tapering stem $a$ to prevent loosening.

What I claim as my invention and desire to secure by Letters Patent is:—

1. A dowel bolt comprising a cylindrical threaded portion having its body tapered with the larger end of the taper at the extreme end of the bolt and opposite sides of the tapered portion having pairs of flat faces with the faces of each pair angularly disposed with respect to each other, the remaining opposed sides having longitudinal tapering recesses with the margins thereof projecting to form flanges about and inclosing said recesses, substantially as described.

2. A dowel bolt comprising a body portion having a cylindrical threaded end and a tapered end with the larger end of the taper at the extreme end of the bolt, the tapered portion having faces recessed within their margins to form projecting flanges about the recessed faces, substantially as described.

In testimony whereof I have hereunto signed my name this 12th day of July 1909, in the presence of two subscribing witnesses.

ERNST THOMAS. [L. S.]

Witnesses:
 OTTO KÖNIG,
 WILLY KLEIN.

Copies of this patent may be obtained for five cents each, by addressing the "Commissioner of Patents, Washington, D. C."